United States Patent
Hoyer et al.

(10) Patent No.: US 10,237,072 B2
(45) Date of Patent: Mar. 19, 2019

(54) SIGNATURES FOR NEAR FIELD COMMUNICATIONS

(71) Applicant: ASSA ABLOY AB, Stockholm (SE)

(72) Inventors: Philip Hoyer, Richmond (GB); Mark Robinton, Eden Prairie, MN (US)

(73) Assignee: ASSA ABLOY AB (SE)

( * ) Notice: Subject to any disclaimer, the term of this patent is extended or adjusted under 35 U.S.C. 154(b) by 0 days.

(21) Appl. No.: 14/897,708

(22) PCT Filed: Jul. 1, 2013

(86) PCT No.: PCT/IB2013/001949
§ 371 (c)(1),
(2) Date: Dec. 11, 2015

(87) PCT Pub. No.: WO2015/001376
PCT Pub. Date: Jan. 8, 2015

(65) Prior Publication Data
US 2016/0142210 A1 May 19, 2016

(51) Int. Cl.
*H04L 29/06* (2006.01)
*H04L 9/32* (2006.01)
(Continued)

(52) U.S. Cl.
CPC .......... *H04L 9/3247* (2013.01); *H04L 9/3268* (2013.01); *H04L 63/126* (2013.01);
(Continued)

(58) Field of Classification Search
CPC ... H04L 9/3247; H04L 9/3268; H04L 63/126; H04L 2209/72; H04L 2209/80;
(Continued)

(56) References Cited

U.S. PATENT DOCUMENTS 6,961,000 B2   11/2005   Chung
7,295,114 B1   11/2007   Drzaic et al.
(Continued)

FOREIGN PATENT DOCUMENTS

CN   102663591       9/2012
CN   102663591 A *   9/2012
(Continued)

OTHER PUBLICATIONS

U.S. Appl. No. 14/772,011, filed Sep. 1, 2015, Hoyer et al.
(Continued)

*Primary Examiner* — Ghodrat Jamshidi
(74) *Attorney, Agent, or Firm* — Sheridan Ross P.C.

(57) ABSTRACT

A data-carrying device and methods of authenticating the same are disclosed. The data-carrying device is described as being capable of communicating via the Near Field Communications (NFC) protocol and may have one or more NFC Data Exchange Format (NDEF) records stored in its memory. The data-carrying device also comprises or has the ability to generate a signature that proves the data-carrying device is the authorized device for storing the one or more NDEF records. A data-carrying device that attempts to transmit an NDEF record without a valid signature may be identified as an unauthorized data-carrying device.

20 Claims, 5 Drawing Sheets

(51) Int. Cl.

| | | |
|---|---|---|
| *H04W 12/06* | (2009.01) | |
| *H04W 12/10* | (2009.01) | |
| *H04W 4/80* | (2018.01) | |
| H04W 12/04 | (2009.01) | |

(52) U.S. Cl.
CPC ............ *H04W 4/80* (2018.02); *H04W 12/06* (2013.01); *H04W 12/10* (2013.01); *H04L 2209/72* (2013.01); *H04L 2209/80* (2013.01); *H04L 2209/805* (2013.01); *H04W 12/04* (2013.01)

(58) Field of Classification Search
CPC ............ H04L 2209/805; H04W 4/008; H04W 12/04; H04W 12/06; H04W 12/10
See application file for complete search history.

(56) References Cited

U.S. PATENT DOCUMENTS

| | | | |
|---|---|---|---|
| 7,942,312 | B2 | 5/2011 | van Ingen |
| 7,965,184 | B1 | 6/2011 | Nichols et al. |
| 8,074,271 | B2 | 12/2011 | Davis et al. |
| 8,285,211 | B2 | 10/2012 | Wang et al. |
| 8,344,853 | B1 | 1/2013 | Warner et al. |
| 8,429,409 | B1* | 4/2013 | Wall ................ H04W 12/04 713/172 |
| 8,880,027 | B1 | 11/2014 | Darringer |
| 9,406,046 | B2 | 8/2016 | Kawaguchi et al. |
| 2004/0093493 | A1 | 5/2004 | Bisbee et al. |
| 2005/0061875 | A1 | 3/2005 | Zai et al. |
| 2006/0230276 | A1 | 10/2006 | Nochta |
| 2006/0277061 | A1 | 12/2006 | Revanur et al. |
| 2007/0052517 | A1 | 3/2007 | Bishop et al. |
| 2007/0106892 | A1 | 5/2007 | Engberg |
| 2007/0180493 | A1 | 8/2007 | Croft et al. |
| 2008/0069347 | A1* | 3/2008 | Brown ................ H04L 9/3066 380/45 |
| 2008/0122584 | A1 | 5/2008 | Itasaki et al. |
| 2009/0055597 | A1 | 2/2009 | Robles |
| 2009/0108063 | A1* | 4/2009 | Jain .................... G06K 7/10237 235/380 |
| 2009/0240946 | A1 | 9/2009 | Yeap et al. |
| 2010/0007466 | A1 | 1/2010 | Shoarinejad et al. |
| 2010/0079237 | A1 | 4/2010 | Falkk et al. |
| 2010/0299527 | A1* | 11/2010 | Arunan ................ H04L 9/3247 713/176 |
| 2011/0025458 | A1 | 2/2011 | Shahriar et al. |
| 2011/0074552 | A1 | 3/2011 | Norair et al. |
| 2011/0249682 | A1 | 10/2011 | Kean et al. |
| 2012/0013448 | A1 | 1/2012 | Baranowski |
| 2012/0159105 | A1 | 6/2012 | Von Behren et al. |
| 2012/0207305 | A1* | 8/2012 | Gallo .................. G06Q 10/10 380/271 |
| 2012/0234908 | A1 | 9/2012 | Wang et al. |
| 2012/0265988 | A1 | 10/2012 | Ehrensvard |
| 2013/0039634 | A1 | 2/2013 | M |
| 2013/0061303 | A1 | 3/2013 | Hart et al. |
| 2013/0102252 | A1 | 4/2013 | Rasmussen et al. |
| 2013/0166917 | A1 | 6/2013 | Granbery |
| 2013/0215467 | A1 | 8/2013 | Fein et al. |
| 2013/0222107 | A1 | 8/2013 | Herscovitch et al. |
| 2013/0237148 | A1* | 9/2013 | McCann ................ H04W 4/008 455/41.1 |
| 2013/0254116 | A1 | 9/2013 | Hayshow et al. |
| 2013/0303085 | A1* | 11/2013 | Boucher ................ H04W 4/80 455/41.1 |
| 2013/0314214 | A1* | 11/2013 | Leica ................ H04W 4/80 340/10.1 |
| 2013/0314334 | A1* | 11/2013 | Leica ................ H04B 5/0031 345/173 |
| 2013/0344804 | A1* | 12/2013 | Chen ................ H04B 5/02 455/41.1 |
| 2013/0344808 | A1 | 12/2013 | Murray et al. |
| 2014/0013406 | A1 | 1/2014 | Tremlet |
| 2014/0023195 | A1 | 1/2014 | Lee et al. |
| 2014/0075572 | A1 | 3/2014 | Mehring et al. |
| 2014/0118113 | A1 | 5/2014 | Kaushik et al. |
| 2014/0123056 | A1 | 5/2014 | Puranik et al. |
| 2014/0173708 | A1 | 6/2014 | Garlick |
| 2014/0256251 | A1* | 9/2014 | Caceres ............... H04B 5/0031 455/41.1 |
| 2014/0282974 | A1 | 9/2014 | Maher et al. |
| 2014/0337205 | A1 | 11/2014 | Tavares |
| 2014/0357187 | A1* | 12/2014 | Ehrensvard ......... H04L 63/0838 455/41.1 |
| 2015/0103383 | A1 | 4/2015 | Dowling et al. |
| 2015/0208245 | A1 | 7/2015 | Robinton et al. |
| 2015/0363599 | A1 | 12/2015 | Hoyer et al. |
| 2016/0012696 | A1 | 1/2016 | Robinton et al. |
| 2016/0021091 | A1 | 1/2016 | Hoyer et al. |
| 2016/0021100 | A1 | 1/2016 | Hoyer |
| 2017/0118201 | A1 | 4/2017 | Hoyer et al. |

FOREIGN PATENT DOCUMENTS

| | | |
|---|---|---|
| EP | 1710764 | 10/2006 |
| EP | 2487629 | 8/2012 |
| EP | 2518657 | 10/2012 |
| WO | WO 2008/028291 | 3/2008 |
| WO | WO 2011/089423 | 7/2011 |
| WO | WO 2012/103584 | 8/2012 |
| WO | WO 2013/034681 | 3/2013 |
| WO | WO 2013/072437 | 5/2013 |

OTHER PUBLICATIONS

"EMV—Integrated Circuit Card Specifications for Payment Systems. Book 2: Security and Key Management," EMVCo, LLC, Jun. 2008, Version 4.2, 177 pages [retrieved from: http://www.iro.umontreal.ca/~salvail/securite/notes2010/EMVv4.2Book2.pdf].

"EPC Radio-Frequency Identity Protocols Generation-2 UHF RFID Specification for RFID Air Interface, Protocol for Communications at 860MHz-960MHz, Version 2.0.0 Ratified," GS1 EPCglobal Inc., Nov. 1, 2013, pp. 1-152 [retrieved from: http://www.gs1.org/sites/default/files/docs/uhfc1g2/uhfc1g2_2_0_0_standard_20131101.pdf].

"NFC Signature Record Type Definition (RTD) Technical Specification," NFC Forum, Nov. 18, 2010, 18 pages [retrieved from: http://members.nfc-forum.org/specs/spec_license].

"Oberthur Technologies partners with HID Global to carry Seos digital keys on NFC SIM cards for mobile access," ASSA ABLOY, Jul. 17, 2013, 1 page [retrieved from: http://www.assaabloy.com/en/com/press-news/news/2013/oberthur-technologies/].

Emms et al. "The Dangers of Verify PIN on Contactless Cards," Computing Science, Technical Report Series, No. CS-TR-1332, May 2012, 14 pages [retrieved from: http://www.cs.ncl.ac.uk/publications/trs/papers/1332.pdf].

Falk et al. "Application of Passive Asymmetric RFID Tags in a High-Assurance Avionics Multi-Domain RFID Processing System," RFID Systems and Technologies (RFID SysTech), 2008 4th European Workshop, Jun. 11, 2008 8 pages [retrieved from: http://ieeexplore.ieee.org/stamp/stamp.jsp?arnumber=05755752].

Kilas et al. "Digital Signatures on NFC Tags Master of Science Thesis," Mar. 18, 2009, 53 pages [retrieved from: http://web.it.kth.se/~johanmon/theses/kilas.pdf].

Leicher et al. "Smart OpenID: A Smart Card Based OpenID Protocol," IFIP Advances in Information and Communication Technology, 2012, vol. 376, pp. 75-86.

Pearson "Securing the Pharmaceutical Supply Chain with RFID and Public-key infrastructure (PKI) Technologies," Texas Instruments, Jun. 2005, White Paper, 12 pages.

Piramuthu "Lightweight Cryptographic Authentication in Passive RFID-Tagged Systems," IEEE Transactions on Systems, Man, and Cybernetics: Part C: Applications and Reviews, May 2008, vol. 38, No. 3, pp. 360-376.

Saeed et al. "Off-line NFC Tag Authenticiation," The 7th International Conference for Internet Technology and Secured Transactions, 2012 International Conference for IEEE, Dec. 10, 2012, pp. 730-735.

(56) References Cited

OTHER PUBLICATIONS

Saros et al. "A Platform for Pervasiv Infrastructures," Next Generation Mobile Applications, Services and Technologies, 2009, NGMAST '09, Third International Conference on IEEE, Piscataway, NR, USA, Sep. 15, 2009, pp. 83-88.
Tan et al. "A Robust and Secure RFID-Based Pedigree System (Short Paper)," Information and Communications Security Lecture Notes in Computer Science, Jan. 2006, pp. 21-29.
Vassilev et al. "Personal Brokerage of Web Service Access," Security & Privacy, Sep. 2007, vol. 5, No. 5, pp. 24-31.
International Search Report and Written Opinion for International (PCT) Patent Application No. PCT/IB2013/002617, dated Feb. 19, 2014 12 pages.
International Preliminary Report on Patentability for International (PCT) Patent Application No. PCT/IB2013/002617, dated Mar. 19, 2015 8 pages.
International Search Report and Written Opinion for International (PCT) Patent Application No. PCT/IB2013/001949, dated Feb. 25, 2014 15 pages.
International Preliminary Report on Patentability for International (PCT) Patent Application No. PCT/IB2013/001949, dated Jan. 14, 2016 10 pages.
International Search Report and Written Opinion for International (PCT) Patent Application No. PCT/IB2014/001558, dated Nov. 12, 2014 11 pages.
International Preliminary Report on Patentability for International (PCT) Patent Application No. PCT/IB2014/001558, dated Sep. 24, 2015 7 pages.
International Search Report and Written Opinion for International (PCT) Patent Application No. PCT/IB2014/000853, dated Sep. 17, 2014 15 pages.
International Preliminary Report on Patentability for International (PCT) Patent Application No. PCT/IB2014/000853, dated Sep. 24, 2015 10 pages.
International Search Report and Written Opinion for International (PCT) Patent Application No. PCT/IB2014/000812, dated Sep. 18, 2014 13 pages.
International Preliminary Report on Patentability for International (PCT) Patent Application No. PCT/IB2014/000812, dated Sep. 24, 2015 8 pages.
International Search Report and Written Opinion for International (PCT) Patent Application No. PCT/IB2014/000843, dated Sep. 12, 2014 13 pages.
International Preliminary Report on Patentability for International (PCT) Patent Application No. PCT/IB2014/000843, dated Sep. 24, 2015 8 pages.
International Search Report and Written Opinion for International (PCT) Patent Application No. PCT/IB2014/002157, dated Feb. 17, 2015 12 pages.
International Search Report and Written Opinion for International (PCT) Patent Application No. PCT/IB2014/002986, dated Jun. 30, 2015 19 pages.
Official Action for U.S. Appl. No. 14/306,078, dated Jul. 2, 2015 11 pages.
Staake et al., "Extending the EPC Network—The Potential of RFID in Anit-Counterfeiting," Symposium on Applied Computing, 2005, pp. 1607-1612.
Notice of Allowance for U.S. Appl. No. 14/772,894, dated Feb. 16, 2017 7 pages.
Final Action for U.S. Appl. No. 14/772,995, dated Jun. 8, 2017 15 pages.
Tan et al., "A Robust and Secure RFID-Based Pedigree System (Short Paper)," Information & Communications Security Lecture Notes in Computer Science; LNCS, Springer, Berlin, Jan. 1, 2006, pp. 21-29.
Official Action for European Patent Application No. 14758165.6, dated Dec. 8, 2016, 9 pages.
Official Action for Australian Patent Application No. 2014229568, dated Feb. 8, 2017, 3 pages.
Official Action for Australian Patent Application No. 2014229575, dated Feb. 7, 2017, 3 pages.
International Preliminary Report on Patentability for International (PCT) Patent Application No. PCT/IB2014/002157, dated Dec. 29, 2016 8 pages.
International Preliminary Report on Patentability for International (PCT) Patent Application No. PCT/IB2014/002986, dated Jan. 26, 2017 14 pages.
Official Action for U.S. Appl. No. 14/426,180, dated Apr. 15, 2016 19 pages.
Official Action for U.S. Appl. No. 14/426,180, dated Sep. 8, 2016 30 pages.
Notice of Allowance for U.S. Appl. No. 14/426,180, dated Feb. 6, 2017 10 pages.
Official Action for U.S. Appl. No. 14/772,894, dated Aug. 8, 2016 13 pages.
Official Action for U.S. Appl. No. 14/772,921, dated Dec. 30, 2016 26 pages.
Official Action for U.S. Appl. No. 14/772,011, dated Feb. 10, 2017 8 pages Restriction Requirement.
Official Action for U.S. Appl. No. 14/772,011, dated May 8, 2017 13 pages.
Official Action for U.S. Appl. No. 14/772,995, dated Sep. 22, 2016 13 pages.
Official Action for U.S. Appl. No. 14/306,078, dated Mar. 1, 2016 11 pages.
Official Action for U.S. Appl. No. 14/306,078, dated Oct. 12, 2016 14 pages.
Notice of Allowance for U.S. Appl. No. 14/306,078, dated Mar. 13, 2017 6 pages.
Fouladgar et al. "A Simple Privacy Protecting Scheme Enabling Delegation and Ownership Transfer for RFID Tags," Journal of Communications, Nov. 2007, vol. 2, No. 6, pp. 6-13.
Notice of Allowance for U.S. Appl. No. 14/772,921, dated Jul. 18, 2017 16 pages.
Official Action for European Patent Application No. 14833596.1, dated Mar. 23, 2018 9 pages.
Official Action for U.S. Appl. No. 14/772,995, dated Mar. 26, 2018 13 pages.
Official Action for U.S. Appl. No. 15/308,978, dated Feb. 23, 2018 18 pages.
Notice of Allowance for U.S. Appl. No. 14/772,011, dated Aug. 24, 2017 11 pages.
Offical Action for U.S. Appl. No. 14/772,995, dated Oct. 3, 2017 15 pages.
Summons to Attend Oral Proceedings for European Patent Application No. 14758165.6, dated Jun. 21, 2018 13 pages.
Official Action for U.S. Appl. No. 14/772,995, dated Sep. 12, 2018 13 pages.

\* cited by examiner

SIGNATURES FOR NEAR FIELD COMMUNICATIONS

CROSS REFERENCE TO RELATED APPLICATIONS

This application is a national stage application under 35 U.S.C. 371 of PCT Application No. PCT/IB2013/001949 having an international filing date of Jul. 1, 2013, which designated the United States, and which is incorporated herein by reference in its entirety.

FIELD OF THE DISCLOSURE

The present disclosure is generally directed toward creating and managing signatures for Near Field Communications (NFC) Data Exchange Format (NDEF) records.

BACKGROUND

One type of identification technology employs Near Field Communications (NFC). NFC is a set of short-range wireless communication technologies that have devices operate at approximately 13.56 MHz and at rates ranging from 106 kbit/s to 848 kbit/s. NFC standards cover communications protocols and data exchange formats, and are based on existing radio-frequency identification (RFID) standards including ISO/IEC 14443 and FeliCa, each of which are hereby incorporated herein by reference in their entirety. The standards include ISO/IEC 18092, which is also incorporated herein by reference in its entirety, and those defined by the NFC Forum.

Another type of technology currently gaining traction and emerging as a viable alternative to NFC is newer versions of the Bluetooth standard (e.g., Bluetooth 4), the entire contents of which are hereby incorporated herein by reference. Bluetooth is a wireless technology standard for exchanging data over short distances (using short-wavelength radio transmissions in the ISM band from 2400-2480 MHz) from fixed and mobile devices, creating personal area networks (PANs) with high levels of security. The primary difference between NFC technologies and Bluetooth technologies is that Bluetooth relies on powered devices for both sides of the communication whereas NFC facilitates communications between a powered device and a passive device (e.g., an NFC tag or credential). In other words, under NFC standards, one device can operate without an internal power source, such as a battery.

There are currently three NFC operating modes defined by the NFC Forum: (1) Card Emulation Mode; (2) Reader/Writer Mode; and (3) Peer-to-Peer Mode. In the Card Emulation Mode, an NFC-enabled phone emulates a contactless card in accordance with ISO 14443 and/or ISO 15693, each of which are hereby incorporated herein by reference in their entirety. Typical applications of the Card Emulation Mode include payment, ticketing, and access control applications.

In the Reader/Writer Mode, the NFC-enabled phone reads a tag and typically performs some function based on the information obtained from the read tag. Typical applications of the Reader/Writer Mode include reading posters with an NFC tag in proximity thereto, interactive advertising, launching mobile Internet (e.g., automated web-browser activation), automated Short Message Service (SMS), and automated call initiation.

In the Peer-to-Peer Mode, two NFC-enabled phones, or similar types of devices, are allowed to exchange data with one another. Typical applications of the Peer-to-Peer Mode include setting up wireless settings (e.g., Bluetooth, Wi-Fi, etc.), sharing business cards, or sharing information between NFC-enabled phones.

Current NFC tags carry NFC Data Exchange Format (NDEF) records, which have a static cryptographic signature to ensure the integrity of the data written to the tag. Unfortunately, this current approach has several weaknesses including clonability (moving the same data to another tag) and replay attacks (playing back the same static message again).

SUMMARY

It is one aspect of the present disclosure to solve the problem of moving valid data from one standard NFC tag to another. In particular, an NDEF record is disclosed that can be created with information about the tag itself including a non-random Unique Identifier (UID) (e.g., MAC address, SIM card number, tag ID, IP address, etc.). In some embodiments, this data can be included in the signature that is calculated for the NDEF record such that the verifier of the NDEF record could compare the record and UID read from the tag to validate the binding via the signature.

Another mechanism to prevent against cloning and replay attacks is disclosed whereby a dynamic signature (which can be based on a nonce sent by the reading device) can be calculated by the tag itself. Since this mechanism is independent of the tag UID, it allows for tags with random UIDs.

In some embodiments, to perform a challenge response authentication, a nonce can be provided to the tag, which is ultimately included in the signature calculation. This nonce could be provided in the request to read the tag data or during a separate authenticate command.

In some embodiments, the tag dynamic signature may be based on a Public Key Infrastructure (PKI) solution (e.g., RSA, ECDS, etc.) and hence also introduces the concept of a tag certificate. This certificate can be added into the standard NDEF security certificate chain so that the returned NDEF data containing the dynamic signature can be verified without any changes to the verification process of current standard NDEF specifications.

The tag certificate could include the unique identifier of the tag (e.g., static UID). The response signature might also return the tag certificate. The introduction of the tag certificate would also allow the concept of a Tag Revocation Service (e.g., a Tag Revocation List distributed and used to check the validity of tag certificates) or Online Certificate Status Protocol (OCSP) online services. Since a reading device might be desirable to check the revocation status of a tag (e.g., without performing authentication), embodiments of the present disclosure also contemplate a command or combination of commands that simply returns the tag certificate without performing any other processes.

The present disclosure will be further understood from the drawings and the following detailed description. Although this description sets forth specific details, it is understood that certain embodiments of the invention may be practiced without these specific details. It is also understood that in some instances, well-known circuits, components and techniques have not been shown in detail in order to avoid obscuring the understanding of the invention.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Figure 1:
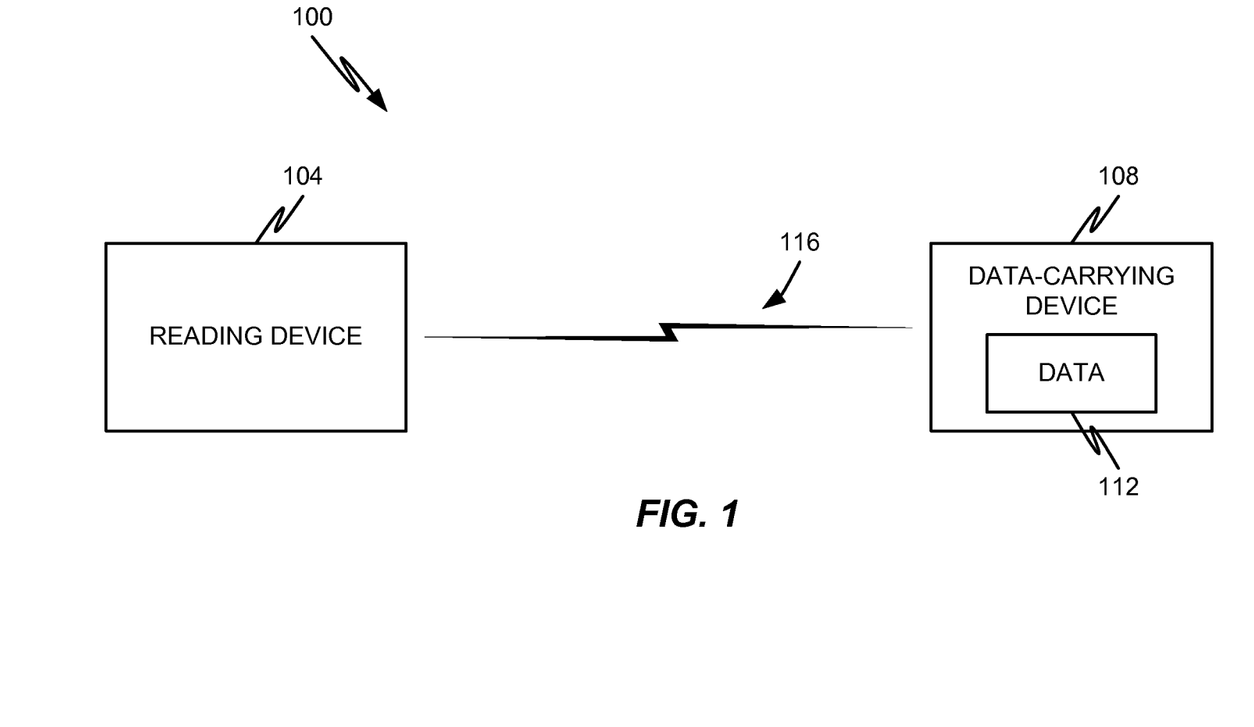
FIG. 1 is a block diagram depicting a transaction system in accordance with embodiments of the present disclosure.

Referring initially to FIG. 1, a transaction system 100 is depicted in accordance with embodiments of the present disclosure. The transaction system 100 is shown to include a reading device 104 and a data-carrying device 108. The reading device 104 and data-carrying device 108 may be configured to exchange data over a wireless communication path 116 using any type of known or yet to be developed wireless communication protocol. In some embodiments, the devices 104, 108 may be configured to exchange data 112 with one another using an NFC protocol, a Bluetooth standard (e.g., Bluetooth 4), infrared, or the like. Where an NFC protocol is used, the data 112 may be stored as an NDEF record or collection of NDEF records.

It should also be appreciated that the communication path 116 does not necessarily have to be wireless. For instance, a wire or cable (e.g., Universal Serial Bus (USB) cable) may be used to carry data between the devices 104, 108.

In some embodiments, the reading device 104 and data-carrying device 108 may each be equipped with NFC interfaces that enable the devices 104, 108 to exchange data in accordance with the NFC protocol. The devices 104, 108 may exchange data using any type of NFC communication mode (e.g., a Card Emulation Mode, a Reader/Writer Mode, or a Peer-to-Peer Mode). When operating in the Card Emulation Mode, the data-carrying device 108 may emulate a card and the reading device 104 may correspond to a reader of the data-carrying device. When operating in the Reader/Writer Mode, the reading device 104 may write data to the data-carrying device 108 or the data-carrying device may write data to the reading device 104.

In accordance with NFC standards, the devices 104, 108 may only be allowed to communicate data with one another when the physical distance between the devices 104, 108 is less than a predetermined distance. As an example, the devices 104, 108 can be configured to exchange wireless communications with one another via NFC as long as the devices are close enough to support such communications (e.g., between approximately 0.01 m and 0.5 m). If Bluetooth is employed, then the mobile devices 104, 108 may communicate with one another as long as the devices are between approximately 0.01 m and 2.0 m of one another. Of course, other protocols such as Wi-Fi, Zigbee, Wi-Max, and the like may be used to exchange data between devices 104, 108.

The data-carrying device 108 may correspond to any type of communication device such as a telephone, a mobile telephone, a cellular phone, a Personal Digital Assistant (PDA), a tablet, a thin client computing device, a netbook, a watch, a key fob, a portable card-shaped credential, or the like. Similarly, the reading device 104 may correspond to a telephone, a mobile telephone, a cellular phone, a PDA, a tablet, a thin client computing device, a netbook, a watch, a key fob, or the like. In some embodiments, the reading device 104 may correspond to a traditional access control reader that may or may not be mounted to a wall or permanent location. In still other embodiments, the reading device 104 may correspond to a mobile access control reader and/or writer.

As shown in FIG. 1, the data-carrying device 108 may have data 112 maintained thereon (e.g., stored in memory of the data-carrying device 108). Although not depicted, the reading device 104 may also comprise data 112 stored thereon. In some embodiments, the data 112 may be used by the data-carrying device 108 to obtain access to one or more assets (e.g., logical and/or physical assets) protected by the reading device 104. For instance, the data-carrying device 108 may provide some or all of the data 112 to the reading device 104 to access one or more assets protected by the reading device 104.

In some embodiments, some or all of the data 112 may be stored in a secure area of memory, such as a Secure Element (SE), a Secure Access Module (SAM), a Subscriber Identity Module (SIM) card, an Integrated Circuit (IC) card, or any other computer memory that is encrypted and/or physically tamper-proof. As a non-limiting example, the data 112 may be stored as an NDEF record or collection of NDEF records along with one or more signatures that can validate the NDEF record or NDEF records. Specifically, NDEF records are a light-weight binary format, used to encapsulate typed data. NDEF records are specified by the NFC Forum, for transmission and storage with NFC, however, NDEF records are transport agnostic. In some embodiments, an NDEF record may include one or more of: typed data, such as MIME-type media, a URI, or a custom application payload. More specifically, an NDEF record may be configured to contain a 3-bit TNF (Type Name Field) that provides high level typing for the rest of the record. The remaining fields are variable length and not necessarily present: type—detailed typing for the payload; id—identifier meta-data; and/or payload—the actual payload.

Figure 2:
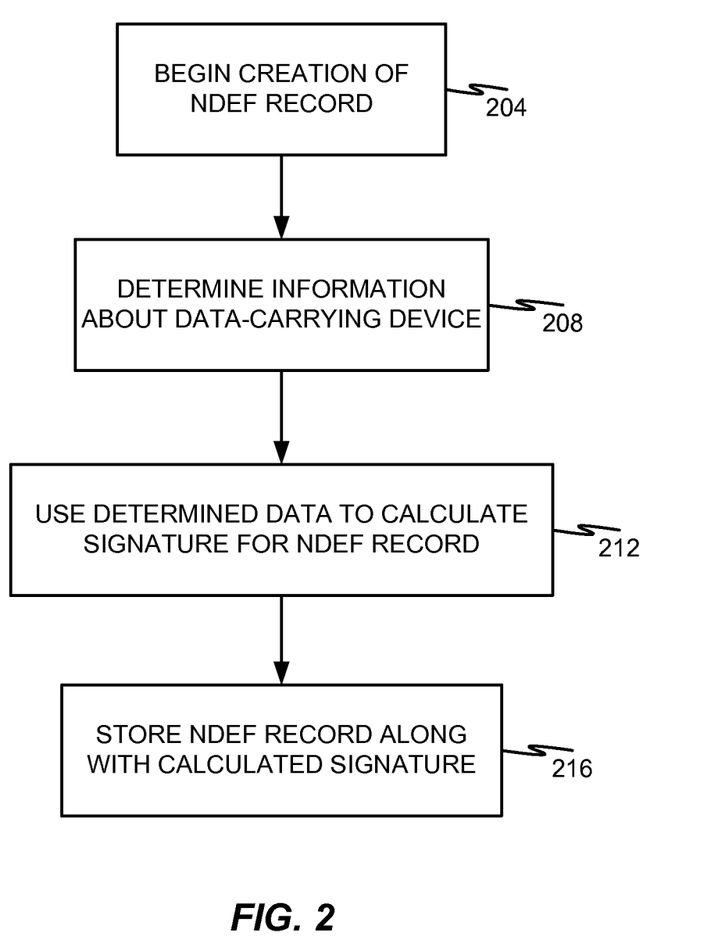
FIG. 2 is a flow diagram depicting a method of generating a signature for an NDEF record in accordance with embodiments of the present disclosure.

With reference now to FIG. 2 a method of generating a signature for an NDEF record will be described in accordance with at least some embodiments of the present disclosure. The method begins when it is determined that a new NDEF record is to be created and/or an NDEF record is to be updated (step 204). Thereafter, the method continues by determining information about the device (e.g., data-carrying device 108) on which the NDEF record will be stored (step 208). In some embodiments, the determining step may include determining a UID, a site code, a card type, information about a user of the device, a hash value generated with one or a combination of such information, an XOR value generated with one or a combination of such information, some other non-random data, or some other value generated from non-random data.

The information determined in step 208 is then used to calculate a signature for the NDEF record (step 212). In some embodiments, the signature generated for the NDEF record or collection of NDEF records is generated by combining the determined information with some or all of the NDEF record. As a non-limiting example, the determined information may be a hash value generated with a combination of the determined information and the NDEF record. In other embodiments, the signature can simply be generated by calculating a hash value with the determined information only. In other embodiments, the signature can simply correspond to a concatenation of the different information obtained in step 208 or a concatenation of the determined information with the NDEF record. It should be appreciated that the mechanism(s) used to generate the signature can vary without departing from the scope of the present disclosure.

Once the signature has been generated for the NDEF record, the signature is stored in the data-carrying device 108 along with the NDEF record (step 216). In some embodiments, both the NDEF record and signature may be stored in a secure area of memory. In other embodiments, the NDEF record may be stored in a secure area of memory while the signature may be stored in a non-secure area of memory. In some embodiments, the signature can be used to validate the binding of the NDEF record with the device on which the NDEF record is stored. As an example, the reading device 104 can validate the data-carrying device 108 as being the intended (and possibly sole) keeper of the NDEF record because the NDEF record was bound with the data-carrying device 108 via the signature. The utilization of such a signature effectively prevents the unauthorized moving valid data 112 from an authorized data-carrying device 108 to an unauthorized data-carrying device.

Figure 3:
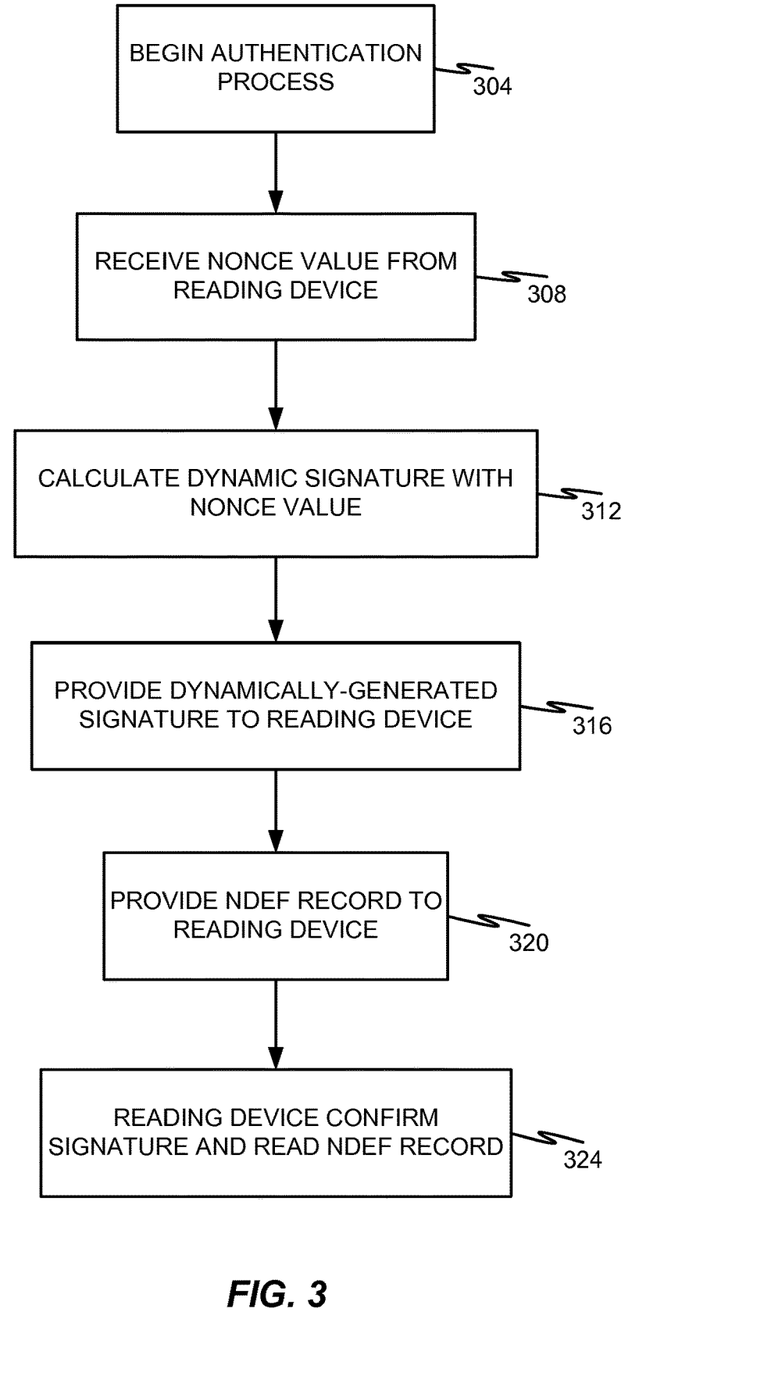
FIG. 3 is a flow diagram depicting an authentication process in accordance with embodiments of the present disclosure.

Another mechanism that can be used to prevent cloning and/or replay attacks is to enable the data-carrying device 108 to generate a dynamic signature during an authentication process. With reference now to FIG. 3 an authentication process will be described in accordance with at least some embodiments of the present disclosure. The method begins when either the reading device 104 or the data-carrying device 108 initiate an authentication process (step 304). In some embodiments, the authentication process is initiated by the reading device 104 when the data-carrying device 108 is placed within a predetermined distance from the reading device 104 (e.g., within a read range of the reading device 104).

The method continues with the reading device 104 providing the data-carrying device with a nonce value, for example (step 308). While a nonce value may correspond to a random or pseudo-random number generated at the reading device 104, a nonce word may be used instead of a nonce value. In other words, any arbitrary number or string may be provided to the data-carrying device 108 to perform the authentication process. It should also be noted that the nonce value can be provided in the request to read data from the data-carrying device 108 or it can be provided in a separate authenticate command (e.g., before or after the data 112 is read from the data-carrying device 108).

Upon receiving the nonce value, the data-carrying device 108 may use the nonce value to generate a dynamic signature (step 312). In some embodiments, the nonce value is brought within a secure element (SE) of the data-carrying device 108 and the signature is calculated within the SE. The dynamically-generated signature is then provided back to the reading device 104 (step 316). It should be noted that since this mechanism can be independent of the data-carrying device 108, this authentication protocol can be used for devices having random UIDs whereas the signature-creation process described in FIG. 2 is suited for devices having non-random UIDs.

The method continues with the data-carrying device 108 providing one or more NDEF records to the reading device 104 (step 320) and then the reading device 104 analyzing the NDEF record(s) and dynamically-generated signature (step 324). Many variations may occur in the execution of steps 308, 312, 316, 320, and 324. For example, the reading device 104 may first ask the data-carrying device 108 for one or more NDEF records and then ask the reading device 104 for a signature. The nonce value used by the data-carrying device 108 to generate the signature may be provided before or after the reading device 104 receives the NDEF records. As another example, the reading device 104 may first perform the authentication process (e.g., provide a nonce value to the data-carrying device and verify authenticity of the dynamic signature received back from the data-carrying device 108) prior to obtaining an NDEF record from the data-carrying device 108. As still another example, the signature and NDEF record may be provided at the same time and the reading device 104 may validate both the signature and NDEF record at the same time. As still another example, the data-carrying device 108 may be configured to embed the nonce in the NDEF record and dynamically generate a signature. Other variants of timing will become apparent to those of ordinary skill in the art and it should be appreciated that the claims are not confined by the illustrative examples described herein.

Figure 4:
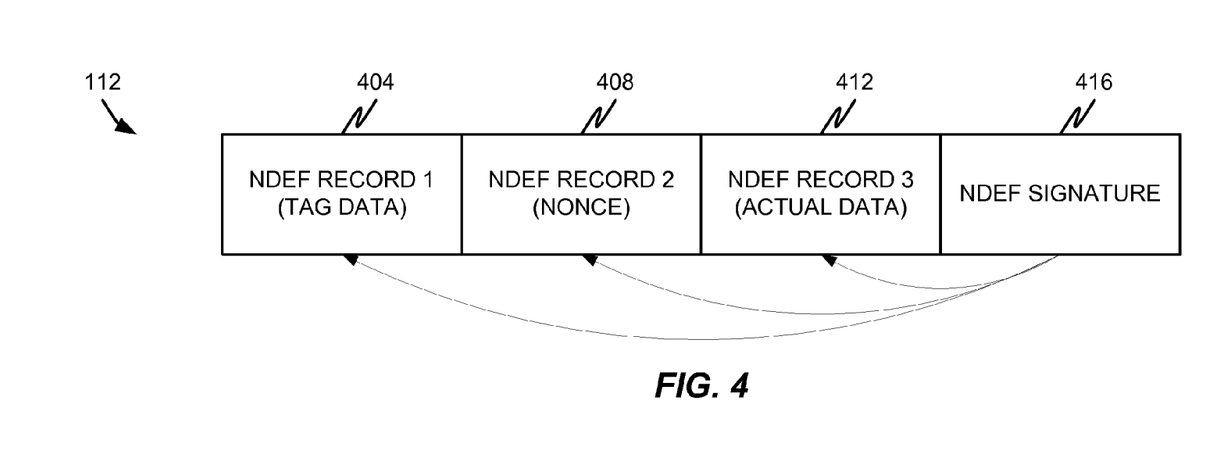
FIG. 4 is a diagram depicting a first data structure in accordance with embodiments of the present disclosure.
Figure 5:
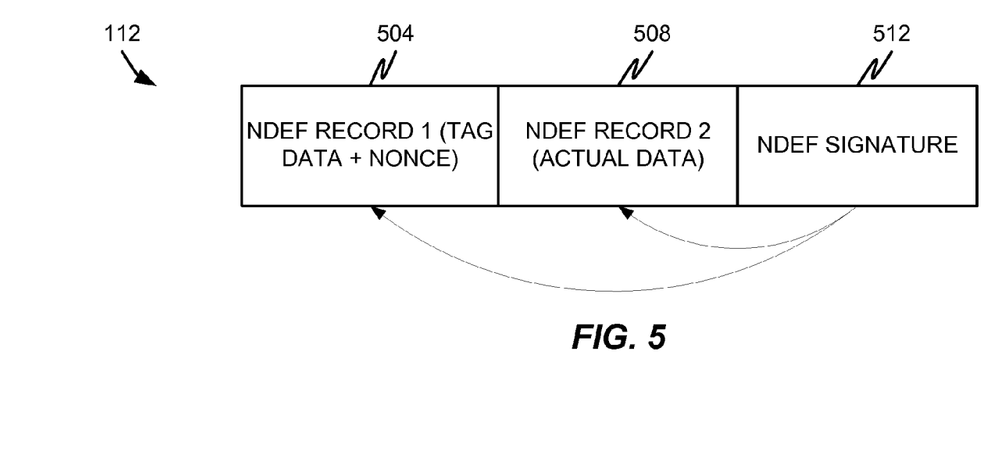
FIG. 5 is a diagram depicting a second data structure in accordance with embodiments of the present disclosure.

FIGS. 4 and 5 depict two examples of the structure in which the data 112 may be stored on the data-carrying device 108. FIG. 4 depicts a data structure having four data fields: a first data field 404 for a first NDEF record that describes the information obtained in step 208 (e.g., tag data, tag UID, etc.); a second data field 408 for a second NDEF record that include the nonce value; a third data field 412 for the actual data to be analyzed by the reading device 104; and a fourth data field 416 for the signature. As discussed above, the NDEF signature stored in the fourth data field 416 may be used to validate one of the other NDEF records stored in the data structure. Additionally or alternatively, the NDEF signature provides a validation that the NDEF records are used to validate the data-carrying device 108. Specifically, the NDEF signature (whether dynamic or based on non-random data) can validate the binding between the NDEF record and the data-carrying device 108 that is intended or authorized to store the NDEF record.

FIG. 5 depicts a data structure having three data fields: a first data field 504 for a first NDEF record that describes the information obtained in step 208 along with a nonce value (or some combination of the two values); a second data field 508 for the actual data to be analyzed by the reading device 104; and a third data field 512 for the signature. The data structure depicted in FIG. 5 may correspond to a compressed version of the data structure depicted in FIG. 4.

Figure 6:
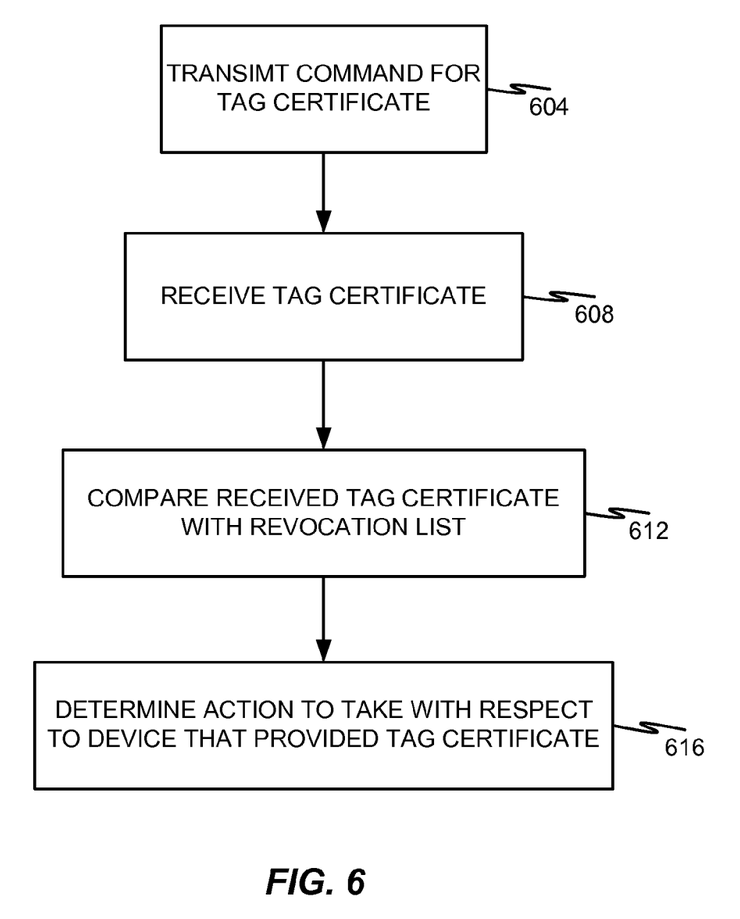
FIG. 6 is a flow diagram depicting a certification method in accordance with embodiments of the present disclosure.

With reference now to FIG. 6, a certification method will be described in accordance with embodiments of the present disclosure. The method begins when the reading device 104 transmits a command to the data-carrying device for a tag certificate (step 604). In response to receiving the command from the reading device 104, the data-carrying device 108 generates and transmits a tag certificate to the reading device 104 (step 608). In some embodiments, the tag certificate may correspond to a dynamically-generated signature, such as those described above. In some embodiments, the tag certificate may correspond to a public signature from a public-private key pair. The reading device 104 (or a certification agency in communication with the reading device 104) may maintain the private key and the data-carrying device 108 may provide the public key corresponding to the private key in a key pair. In some embodiments, the tag certificate may have been added to the standard NDEF security certificate chain, so that an NDEF record containing the dynamic signature can be verified by the reading device 104 without any changes to the verification process defined in current NDEF specifications. In some embodiments, the tag certificate could include the non-random data (e.g., static UID). It should also be appreciated that the tag certificate could be provided to the reading device 104 during authentication (e.g., in step 316 or 320).

Upon receiving the tag certificate, the reading device 104 may compare the tag certificate with a revocation list that has been provided or made available to the reading device 104 (step 612). In other embodiments, the reading device 104 may provide the tag certificate to a third party for comparison with a revocation list. Based on the comparison of the tag certificate with the revocation list, the reading device 104 or some other device may determine and execute one or more actions or decide to perform no action (step 616). As an example, if the tag certificate received from the data-carrying device 108 matches a tag certificate in a revocation list, then the reading device 104 or some other device may cause an alarm to be sounded, light one or more lights, the presenting data-carrying device 108 may be considered and treated as untrusted, security personnel may be notified, etc. More specifically, the tag revocation list may contain an identification of tag certificates that are either revoked or on hold. A tag certificate may be revoked irreversibly if it is discovered that the certificate authority improperly issued a certificate or if a private key is thought to be compromised. If this is the case, then the tag certificate may be added to the certificate revocation list. A tag certificate may also be considered temporarily invalid if the whereabouts of the certificate are unknown. The revocation list may also list these types of certificates that are currently being held. If a data-carrying device 108 presents a tag certificate that is listed on the revocation list, then actions consistent with identifying an untrusted data-carrying device 108 may be performed.

It should be appreciated that while embodiments of the present disclosure have been described in connection with a revocation list, the present disclosure is not so limited. For instance, a white list may be used instead of or in combination with a revocation list. Any other type of black or white listing processes may be performed in connection with the tag certificates, dynamic signatures, and static signatures described herein.

In the foregoing description, for the purposes of illustration, methods were described in a particular order. It should be appreciated that in alternate embodiments, the methods and steps thereof may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, SIMs, SAMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
   receiving a first input at a data-carrying device that is storing one or more Near Field Communications (NFC) Data Exchange Format (NDEF) records;
   generating a signature for binding the one or more NDEF records to the data-carrying device, the data-carrying device using the first input to generate the signature; and
   providing the signature from the data-carrying device to a reading device so that the reading device can validate the binding between the one or more NDEF records and the data-carrying device thereby determining that the data-carrying device is authorized to store the one or more NDEF records.

2. The method of claim 1, wherein the signature is generated in a Secure Element (SE) of the data-carrying device.

3. The method of claim 2, wherein the data-carrying device comprises an NFC-enabled mobile communication device.

4. The method of claim 1, wherein the first input comprises non-random data that describes at least one of the data-carrying device and a user of the data-carrying device.

5. The method of claim 4, wherein the non-random data comprises a Unique Identifier (UID) assigned to the data-carrying device.

6. The method of claim 1, wherein the first input comprises a nonce value.

7. The method of claim 6, wherein the data-carrying device dynamically generates the signature in response to receiving the nonce value from the reading device and wherein the nonce value is embedded in the one or more NDEF records.

8. The method of claim 1, further comprising:
comparing the signature received from the data-carrying device with a tag revocation list; and
based on the comparison of the signature with the tag revocation list, determining whether or not the signature corresponds to a revoked tag certificate.

9. The method of claim 1, wherein the one or more NDEF records are stored in a Secure Element (SE) of the data-carrying device.

10. The method of claim 9, wherein the signature is also stored in the SE of the data-carrying device.

11. A data-carrying device, comprising:
a Near Field Communications (NFC) interface, which enables the data-carrying device to exchange NFC Data Exchange Format (NDEF) records with other NFC-enabled devices; and
memory in which at least one NDEF record is stored along with a binding signature which provides proof that the data-carrying device is authorized to store the at least one NDEF record.

12. The device of claim 11, wherein the binding signature is generated with non-random data that describes the data-carrying device.

13. The device of claim 12, wherein the non-random data comprises a Unique Identifier (UID) assigned to the data-carrying device.

14. The device of claim 11, wherein the binding signature is generated with a randomly or pseudo-randomly generated number.

15. The device of claim 11, wherein the memory comprises a Secure Element (SE) and wherein the binding signature provides proof that the data-carrying device is the sole device authorized to store the at least one NDEF record.

16. A method, comprising:
receiving a first input at a data-carrying device that is storing one or more Near Field Communications (NFC) Data Exchange Format (NDEF) records;
generating a signature for the one or more NDEF records, the data-carrying device using the first input to generate the signature; and
providing the signature from the data-carrying device to a reading device so that the reading device can validate that the data-carrying device is authorized to store the one or more NDEF records based on the reading device determining that the one or more NDEF records are bound with the data-carrying device via the signature.

17. The method of claim 16, wherein the reading device determines at substantially the same time that: (i) the one or more NDEF records are valid and (ii) the data-carrying device is the sole device allowed to store the one or more NDEF records based on the reading device determining that the one or more NDEF records are bound with the data-carrying device via the signature.

18. The method of claim 16, wherein the first input comprises non-random data.

19. The method of claim 16, wherein the first input comprises random data.

20. The method of claim 16, wherein the first input comprises non-random data that describes the data-carrying device.

* * * * *